(12) United States Patent
Winkler et al.

(10) Patent No.: US 7,566,998 B2
(45) Date of Patent: Jul. 28, 2009

(54) DECOUPLING DEVICE AND METHOD FOR THE PRODUCTION OF AN ELECTRIC MOTOR

(75) Inventors: Wolfgang Winkler, Schutterwald (DE); Hartmut Nitzsche, Buehl (DE); Heinz Seibert, Achern (DE); Bernhard Rupp, Sulzfeld (DE); Michael Kupferer, Rheinau Freistett (DE); Michael Stafne, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 305 days.

(21) Appl. No.: 10/559,417

(22) PCT Filed: Apr. 21, 2004

(86) PCT No.: PCT/DE2004/000825

§ 371 (c)(1),
(2), (4) Date: Dec. 7, 2005

(87) PCT Pub. No.: WO2004/112219

PCT Pub. Date: Dec. 23, 2004

(65) Prior Publication Data

US 2006/0125330 A1      Jun. 15, 2006

(30) Foreign Application Priority Data

Jun. 12, 2003    (DE)    ................... 103 26 996

(51) Int. Cl.
H02K 5/24    (2006.01)

(52) U.S. Cl. ........................................................ 310/51

(58) Field of Classification Search ............... 310/51, 310/89, 91
See application file for complete search history.

(56) References Cited

U.S. PATENT DOCUMENTS

| 2,881,995 | A | * | 4/1959 | Neher ........................ 248/604 |
| 3,746,894 | A | * | 7/1973 | Dochterman et al. .......... 310/51 |
| 4,461,446 | A |   | 7/1984 | Hannibal et al. |
| 5,772,176 | A |   | 6/1998 | Keck et al. |
| 5,861,691 | A | * | 1/1999 | Soh et al. ...................... 310/89 |
| 6,897,580 | B2 | * | 5/2005 | White .......................... 310/51 |
| 2004/0032177 | A1 | * | 2/2004 | Nitzsche et al. ............... 310/91 |

FOREIGN PATENT DOCUMENTS

| DE | 43 34 124 | 9/1994 |
| DE | 43 34 202 | 4/1995 |
| DE | 199 42 840 | 3/2001 |
| DE | 101 42 174 | 3/2003 |
| EP | 0 682 396 | 11/1995 |

* cited by examiner

*Primary Examiner*—Nguyen N Hanh
(74) *Attorney, Agent, or Firm*—Michael Best & Friedrich LLP

(57) ABSTRACT

The invention relates to a device for mounting an electric motor (10) in a manner that isolates vibrations, in particular a fan motor, wherein the electric motor (10) features at least one pole housing (12, 14) serving as a magnetic yoke circuit, as well as means (26, 27) for fastening isolating elements (32, 33), in particular elastic isolating elements. In accordance with the invention it is proposed that the means (26, 27) for fastening the isolating elements (32, 33) are embodied to be a single piece with the pole housing (12, 14).

20 Claims, 5 Drawing Sheets

DECOUPLING DEVICE AND METHOD FOR THE PRODUCTION OF AN ELECTRIC MOTOR

BACKGROUND OF THE INVENTION

The invention starts with a device for mounting an electric motor in a manner that isolates vibrations.

Electric motors, such as those that are used in fans of heating and/or air conditioning systems in motor vehicles, are as a rule vibrationally isolated vis-à-vis the vehicle in order to avoid or reduce the transmission of structure-borne noise from the motor or the fan unit to the body and thus to the passenger compartment of the vehicle.

Running noise from the electric motor and run-induced vibrations that are generated, e.g., by an imbalance in a fan wheel that must be driven, are transmitted as a result to a high degree to the housing and lead to the undesirable development of noise.

Common fastening methods for these types of motors consist of inserting the complete motor in a plastic housing or a housing made of metal, which is provided with a flange for connection to the air conditioner. Normally, rubber or correspondingly formed rubber elements are inserted between the motor and the motor housing or in the flange in order to dampen the stimulation of vibrations of the air conditioner or the body and to suppress noises in the passenger compartment of the vehicle that are annoying to the driver or his passengers.

In the case of elastic isolating elements, which, on the one hand hold the electric motor on support areas and, on the other hand, are supposed to provide dampening, these opposing requirements lead to the isolating element being pre-tensioned for example. Since the dampening of the vibrations therefore occurs via flexing work in the isolating elements, no optimal isolation is possible.

During operation of the electric motor, tangential torsional vibrations as well as vibrations in the radial and axial direction, among other things, are generated in the main direction of stimulation of vibrations of the motor. For isolation between the motor and a receptacle housing for the motor, which is supposed to simultaneously serve as an isolating housing, this means that the isolation in the tangential direction must be particularly soft, but clearly more rigid in the axial direction or radial direction.

There are currently several variations in practical use of arranging the isolating elements between the housing flange or between the motor and the motor housing in order to achieve vibrational isolation of the electric motor vis-à-vis the motor housing and as a result vis-à-vis the body.

Thus, for example DE 43 34 124 A1 discloses a device to accommodate an electric motor, which achieves an effect that is particularly low in vibrations and therefore noise dampening, in that at least one elastic dampening element is arranged between the inner walls of this receptacle device and the outer walls of the motor housing that face these, and the dampening element is supported on the facing walls of the receptacle device and the motor housing.

The elastic dampening elements, which are correspondingly formed rubber elements in a preferred embodiment of the device in DE 43 34 124 A1, means increased assembly and material expenses, which unnecessarily increases the costs of such a device.

Using elastic balls, made preferably of an elastomer, is known from EP 0 682 396 A2 in order to isolate two components from one another. In doing so, the balls are each accommodated in an ellipsoidal cavity so that a certain degree of free rotational movement is made possible for the balls. Each of the components has these types of cavities, which are attached in such a way that the cavities of both components lie opposite from one another in a built-in state.

Typically the electric motor is put in an adapter housing on which corresponding holding means are provided to accommodate the isolation bodies. The unit made of up electric motor, adapter and isolation means is then inserted into a motor housing or another functional housing.

An isolating device for actuators, such as electric motors for example, is known from DE 199 42 840 A1, in which a single-piece or multi-piece isolation housing is connected with a functional housing in such a way that a plurality of isolating elements arranged in pairs between the housings is arranged and respectively fixed by a holding element, whereby the actuator acts on the holding elements.

Disadvantageous in the case of the arrangement in accordance with DE 199 42 840 A1 is the expensive construction, which because of the numerous components requires clearly increased assembly expenditures and thus also cost expenditures for isolating the vibrations of an electric motor.

SUMMARY OF THE INVENTION

In contrast, the device in accordance with the invention for mounting an electric motor in a manner that isolates vibrations has the advantage that means for fastening isolating elements can be embodied in a simple manner. The fact that the means for fastening the isolating elements are embodied to be a single piece with the pole housing of the electric motor eliminates the necessity of putting the electric motor in an additional adapter housing, which can then in turn be isolated vibrationally vis-à-vis a receptacle housing.

The holding means for the isolating means that isolate the vibrations are formed in an advantageous manner directly from the pole ring material. As a result, it is possible already during manufacture of the pole housing to make sure that corresponding orientation brackets are placed in the steel sheet strips forming the subsequent pole housing. After, cutting to size and subsequent rolling of the pole housing as well as closing the joint seam, the pole housing can be processed further with the applied holding means during assembly of the motor.

If the motor is built into a complete fan module for example, then the holding means for the isolating elements can be oriented afterward with a tool and corresponding isolating elements can be attached to these holding means. In this manner, it is possible to isolate the motor vis-à-vis the motor housing or the receptacle housing and achieve optimized, i.e. reduced, noise behavior of a fan, for example. The adapter to accommodate the electric motor that was required to a large extent until now is completely eliminated in an advantageous manner.

If it is not necessary to isolate the motor vis-à-vis a motor housing or a receptacle housing, the motor can be installed and operated without isolating elements and with applied holding means.

The device in accordance with the invention for mounting an electric motor in a manner that isolates vibrations thus renders possible a clear reduction in the number of components and as a result leads to simplified assembly of the motor system.

In an advantageous embodiment of the device in accordance with the invention, the pole housing is formed as a double rolled, i.e., double-layer, cylinder. In this way, it is possible to embody the holding elements on the outer layer of the cylinder and merely provide an opening in the inner layer of the cylinder to orient the holding means for the isolating elements using a corresponding tool. As a result of this type of double rolled pole housing, it is possible, despite the defective spots in the surface of the pole housing, to influence the magnetic flow only to a small degree so that the pole housing retains it full functionality as a yoke ring.

In alternative embodiment it is also possible, however, to embody the pole housing as only a single layer and embody the holding elements for the isolating bodies out of the housing wall of the pole housing. The reduction in the magnetic flow produced by the defective spots in the pole housing serving as a magnetic yoke ring must be accepted in this case. The device in accordance with the invention is constructed extremely simply in this embodiment.

The means to fasten the isolating elements are advantageously embodied in the form of holding brackets, which are connected as a single piece with the pole housing, developed from it and oriented vis-à-vis the surface of the pole housing.

In doing so, the holding brackets are essentially oriented in the radial direction so that the motor isolating elements fastened to the holding brackets end up lying horizontally when the electric motor is installed between the pole housing surface and the inside of a motor housing accommodating the motor.

In order to achieve the best possible fastening of the isolating elements, provisions can be made to arrange the means to fasten the isolating elements (holding brackets) in pairs. In particular, the holding brackets can be arranged axial to the pole housing in this case so that, e.g., roll-shaped isolating elements can be fastened at two locations.

In another embodiment of the device in accordance with the invention, provisions can be made to orient the holding brackets essentially tangential to the pole housing. The isolating elements that are preferably embodied in the form of roll bodies can then, e.g., be assigned in pairs to such a tangentially oriented holding bracket. In order to make simple and quick mounting of the isolating elements on the holding means possible, it can advantageously be provided that the isolating elements be connected to one another in pairs. At the same time, the connection of the isolating elements advantageously serves to connect the isolating elements with the holding means of the pole housing.

With the method in accordance with the invention to manufacture an electric motor, it is possible in a simple manner to provide means, which, if necessary, make it possible to fasten elastic isolating elements on the pole housing of an electric motor and thereby integrate the electric motor in a motor receptacle, e.g., a fan housing, in a manner that isolates vibrations. The pole housing is preferably double rolled in order to lose as little as possible of the magnetic flow via the orientation of the holding means. This type of double rolled pole housing is composed originally of two steel sheet strips, which are first cut to size, e.g., punched, before the "rolling" work step. During this work step, the provided holding means can also already be put advantageously on the sheet of the outer ring at the same time and, if need be, an assigned elongated hole can be put in the corresponding location of the inner ring. This elongated hole on the inner ring enables subsequent placement of an orientation tool, which can be used to orient the holding means in a radial direction from the pole housing.

After cutting the steel sheet strips of the pole housing to size, the further course of manufacturing the pole housing takes place in a known manner, i.e., rolling of the sheets into a cylinder as well as closing the joint seam. The pole housing that is manufactured in this manner can then be further processed with the still applied holding means during motor assembly. If such a motor is e.g., installed in a complete fan module, the holding means can be oriented afterward with a corresponding tool and isolating elements can be attached to the holding means. These isolating elements then make sure that the electric motor can be arranged in the fan module or a motor housing in a manner that isolates vibrations.

A correspondingly prepared motor, in which the holding means are not oriented, however, can also be advantageously supplied to a customer as a separate final product, who can orient the holding means in accordance with his desired intended use, or else use the electric motor without the use of the holding means in accordance with the invention.

Additional advantages of the device in accordance with the invention for mounting an electric motor in a manner that isolates vibrations are presented in the following drawings as well as in the associated description of the exemplary embodiments.

BRIEF DESCRIPTION OF THE DRAWINGS

Exemplary embodiments of the device in accordance with the invention for mounting an electric motor in a manner that isolates vibrations are depicted in the drawings, which will be explained in greater detail in the following description. The figures of drawings, the description thereof as well as the claims contain numerous features in combination. The person skilled in the art will also observe these features individually and combine them into additional, meaningful combinations, which are therefore also disclosed in the description.

The drawings show.

DETAILED DESCRIPTION

Figure 1:
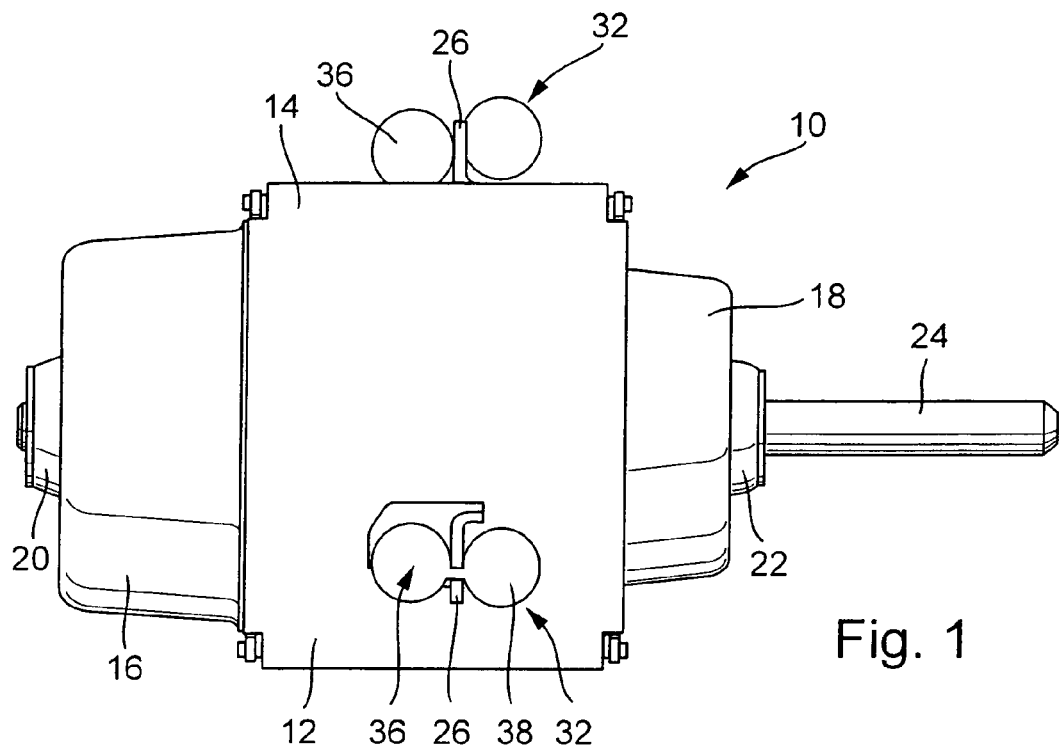
FIG. 1 A schematic depiction of an electric motor with a device in accordance with the invention.

FIG. 1 shows an electric motor like those used in an air conditioning fan of a motor vehicle for example.

The electric motor 10 features a double-layer pole ring 14 that serves as a pole housing 12, on whose inner circumferential surface magnets are attached in a known manner, which serve as the stator of the electric machine 10. The pole ring 14 in this case serves as a magnetic yoke circuit of the electric motor 10. Also fastened to the pole ring 14 is a first shaft-side end shield 16 as well as a second armature-side end shield 18.

The first end shield 16 and the second end shield 18 each feature a bearing 20 or 22 into which the shaft 24 that has a working connection with the rotor of the electric motor 10 is guided.

The pole housing of the electric motor in accordance with FIG. 1 is comprised of a double-layer cylindrical pole ring 14, which is manufactured by rolling and subsequent joining of two correspondingly formed steel sheet strips.

The outer layer of the pole ring 14 features a plurality of bracket-shaped holding elements 26, which are formed as a single piece with the outer layer of the pole ring and uniformly distributed over the circumference of the pole housing. At least three such holding elements are arranged in an advantageous manner, preferably in a plane perpendicular to the axis of the pole housing. Other numbers of holding means and/or other orientations of said holding means can be used in other exemplary embodiments The pole housing 12 is comprised originally of two steel sheet strips 28 or 30, which in the course of the manufacturing process are first cut to size and formed, e.g., using a punching process, before the "rolling" work step. In this work step, the provided holding elements 26 are put on the steel sheet strip 30 in the form of orientation brackets, and this steel sheet strip will later form the outer layer of the pole housing 12. In a corresponding manner, a hole, preferably an elongated hole, will be put in the steel sheet strip 28 that will later form the inner layer of the pole ring. The elongated hole on the inner ring 28 enables subsequent placement of an orientation tool for orienting the bracket-shaped holding element 26. After forming the steel sheet strip 28 or 30, the normal further manufacturing sequence of the pole housing 12 of the electric motor takes place. The steel sheets 28 or 30 are rolled, the seam is closed and the pole housing is calibrated.

The pole housing 12 can then be further processed with the still applied holding means 26 during motor assembly or handed over to an end user. If the electric motor 10 is installed in a complete motor housing, e.g., a fan module, the holding means 26 are oriented afterward with a corresponding tool and isolating elements 32 are fastened to the holding elements.

The holding elements 26 of the electric motor 10 in accordance with the exemplary embodiment in FIG. 1 each feature an indentation 34 into which the isolating elements 32 can be inserted. At least three holding elements 26 are advantageously distributed uniformly on the surface of the pole housing 12.

The single-piece isolating elements 32 in the exemplary embodiment in accordance with FIG. 1 essentially have a dumbbell-like shape, consisting of two elastic spherical elements 36 and 38, which are permanently connected to each other with a rectangular parallelepipedal connection having a smaller cross section 40. Other cross sections of the connecting bridge 40 are also possible, of course. The connecting element or the connecting bridge 40 between the two spherical elements 36 and 38 of the isolating elements 32 is respectively inserted in the indentation 34 of the holding element 26 and clamped in it for example. The isolating elements 32 are typically comprised of an elastic material, e.g., an elastomer. In addition, the dumbbell-like shape of the isolating elements 32 also serves the simple mountability of the isolating elements.

The release of torque by the electric motor 10 results in a rolling movement of the isolating elements 36 and 38 that are embodied as balls. In the process, the isolating elements are compressed elastically and generate a restoring force as a result of the elastic deformation. In this way, it is possible to dampen the vibrations of the electric motor 10 so that these vibrations are not passed on to the motor housing 42 or the fastening flange 44 at all or only in a clearly reduced manner.

In doing so, the necessity for an additional, vibrationally isolating mounting to accommodate the motor is eliminated in an advantageous manner. In doing so, it is possible to embody the holding elements that project radially from the pole housing without an essential low of electrical flow.

Several exemplary embodiments for installing the device in accordance with the invention are presented as examples in the following.

Figure 2A:
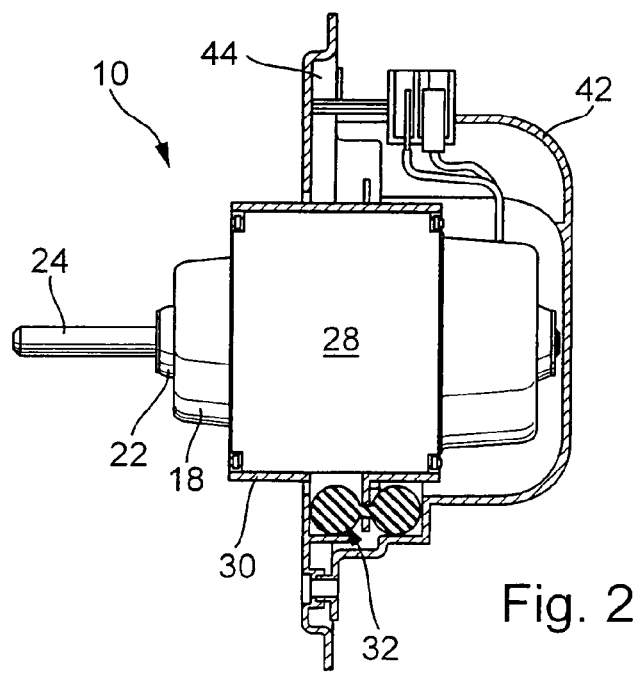
FIG. 2 A longitudinal section (2a) through an electric motor that is inserted into a motor housing, with the device in accordance with the invention as well as detailed view (2b) of the area of the holding means in accordance with the invention.
Figure 2B:
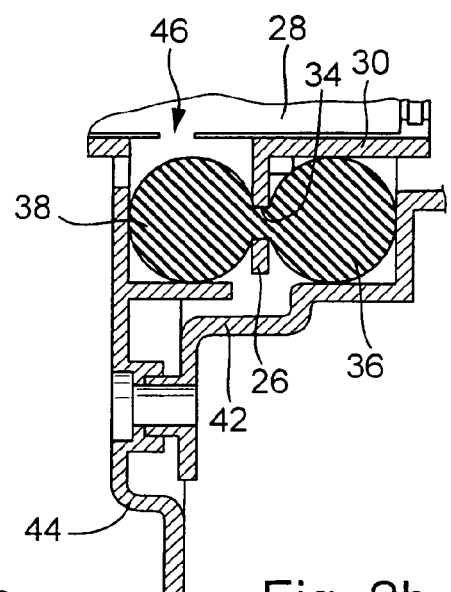

FIG. 2 shows an electric motor 10 inserted in a motor housing 42 as well as a detailed view of the area of an isolating element 32 with an inserted electric motor. Accommodating DC motors in fan modules has typically been accomplished until now by means of a separate plastic adapter or other additional plastic parts, which accommodate the required isolating elements and the motor and thereby isolate the motor towards the motor housing. In the case of the device in accordance with the invention for mounting an electric motor in a manner that isolates vibrations, this type of additional adapter for accommodating the motor is no longer required in the motor housing.

The fan motor in accordance with the exemplary embodiment in FIG. 2 is held between a motor flange plate 44 and the motor housing 42. The isolating elements 32 that act as dampening elements are attached to the holding elements 26 that project radially from the motor, and the holding elements are a single-piece part of the yoke ring. Curved receptacle dishes for the isolating elements 32 can be formed in an advantageous manner in the motor flange plate 44 or the motor housing 42 thereby making assembly that is low in vibration possible. The assembly of this type of fan motor is thereby simplified to an axial joining process.

In the installation position of the electric motor, the isolating elements 32, which are connected to the holding elements 26 of the pole housing 12 via the connecting means 40, end up lying horizontally between the surface of the pole housing 12, on the one hand, and the inner surface of the motor housing 42 or the inner surface of a flange 44, on the other. In the process, the flange 44 closes the motor housing 42 and in addition serves to fasten the overall system on the body of a motor vehicle for example.

By using the spherical isolating elements in combination with a corresponding coordination of the motor flange plate 44 or the motor housing 42, it is possible to influence the elastic properties of the isolating elements 32 in the mounting in a targeted manner in order to thereby achieve, if necessary, a different dampening behavior in the radial, axial or tangential direction.

Figure 3A:
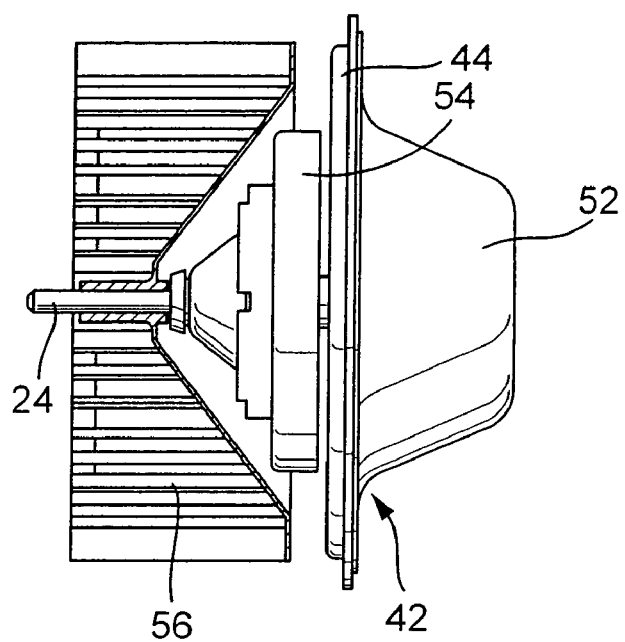
FIG. 3 A first alternative exemplary embodiment for the arrangement of the isolating elements in an overview (3a) and in a detailed representation (3b).

FIG. 3 shows an alternative exemplary embodiment of a fan with an isolating device in accordance with the invention. The overview representation in FIG. 3a shows a complete fan 11 with an electric motor installed in a motor housing 42. The shaft 24 of the electric motor is guided out of the motor housing and permanently connected to a fan wheel 56.

The motor housing 42 of the exemplary embodiment in accordance with FIG. 3 is comprised of a pot-shaped lower part 52 of the motor housing and an annular upper part 54 of the motor housing that is connected to the lower part. The motor flange 44 is arranged as a single piece on the lower part 52 of the motor housing.

Figure 3B:
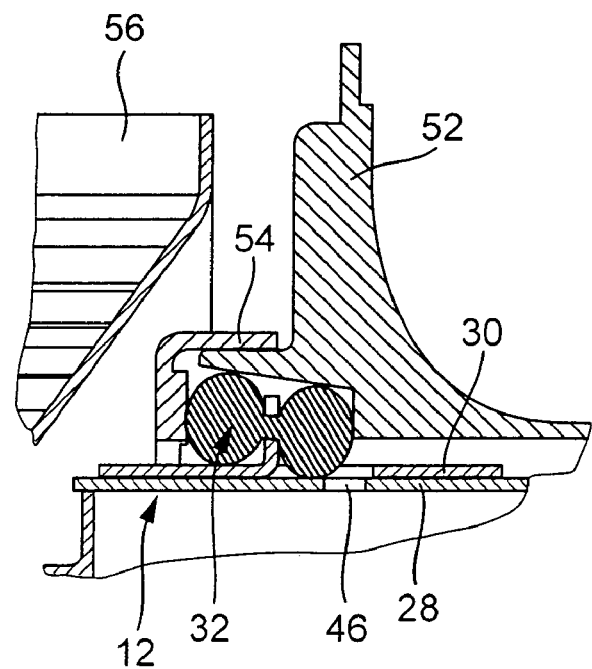

FIG. 3b shows a detailed view of the arrangement of an isolating device in accordance with the invention in an exemplary embodiment according to FIG. 3. In this case, the isolating element 32 sits completely in the motor housing 42 and comes to bear against the pole housing 12 of the electric motor 10 as well as against the lower part 52 of the motor housing and the upper part 54 of the motor housing. Via a corresponding variation of the distance d between the lower part 52 of the motor housing and the upper part 54 of the motor housing, the press-in pressure on the isolating elements 32 can be modified. In this way, it is possible to realize different degrees of isolation for the isolating device in accordance with the invention. The distance d can be varied, e.g., by the ring 54 that forms the upper part of the motor housing being screwed on the lower part 52 of the motor housing a different distance. Of course, other fastening methods between the upper and lower parts of the motor housing 42 are also possible.

Figure 4A:
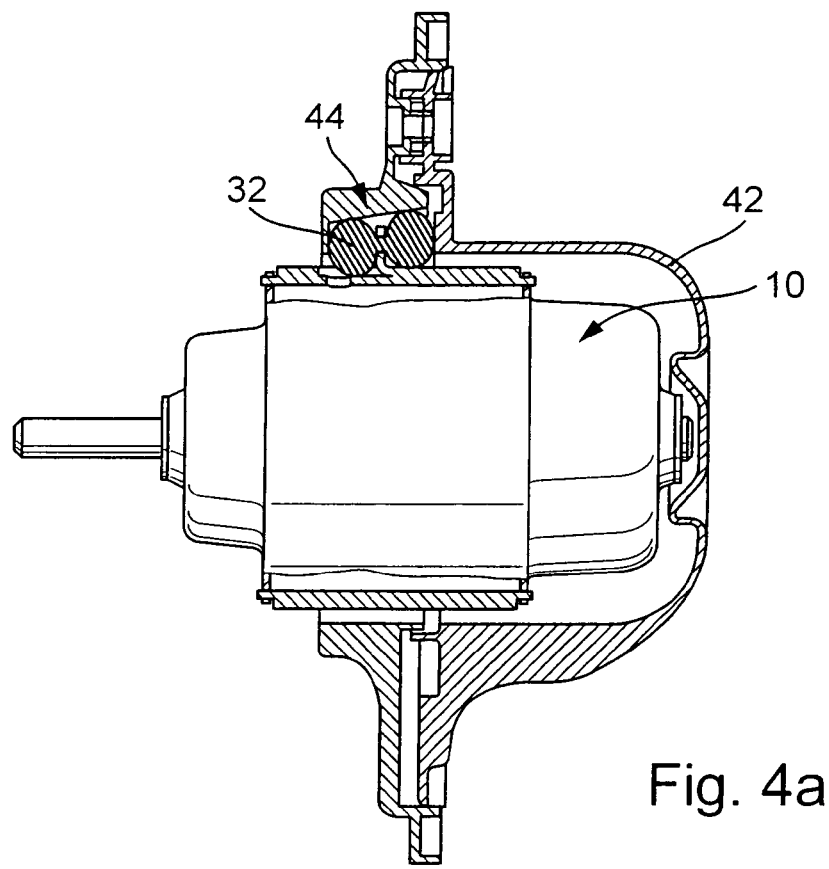
FIG. 4 A second alternative exemplary embodiment for the arrangement of the isolating elements in an overview (4a) and in a detailed representation (4b).

FIG. 4 shows another exemplary embodiment of the drive unit of a fan. The fan wheel has been detached in this depiction. The overview representation in FIG. 4a shows an electric motor 10 installed in a motor housing. The motor housing 42 of the exemplary embodiment in accordance with FIG. 4 is comprised of a pot-shaped lower part 58 of the motor housing, which is closed via a housing flange 60 in the direction of the fan wheel (not shown). In this embodiment, the isolating elements 32 end up lying horizontally on one side in the motor flange. Only one application surface 62 with the actual motor housing is yielded.

Figure 4B:
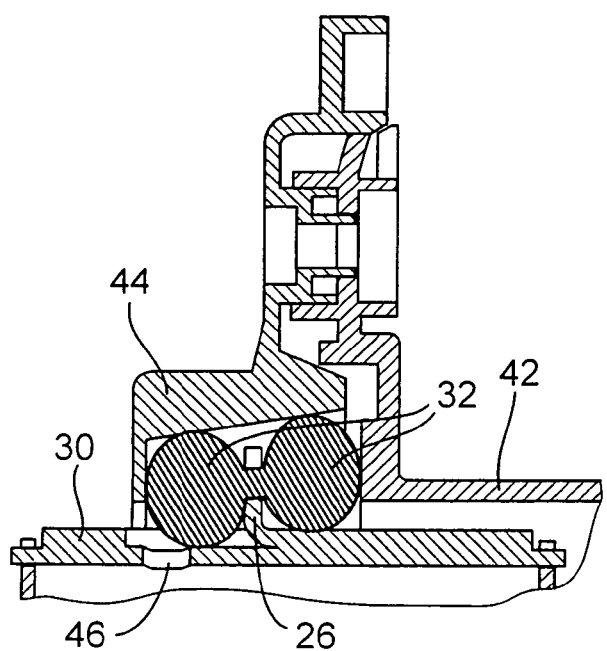

For explanatory purposes, FIG. 4b shows a detailed view of the isolating device in accordance with the invention as per the exemplary embodiment in FIG. 4.

Figure 5:
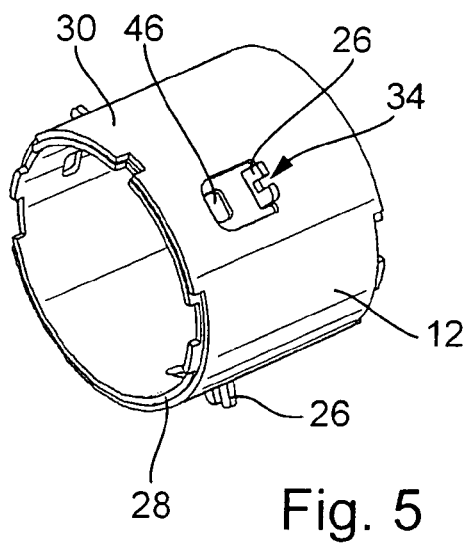
FIG. 5 A perspective representation of a pole housing of an electric motor in accordance with the invention.

FIG. 5 shows a double-layer pole housing 12 with correspondingly oriented holding elements 26. The layers of the pole housing are each formed in this case of a rolled steel sheet strip 28 or 30. The steel sheet strip 28 forms the inner pole ring and the steel sheet strip 30 forms the outer pole ring. The holding elements 26 of the exemplary embodiment according to FIG. 5 are worked out of the steel sheet strip 30 as a single piece and therefore attached to the surface of the pole housing 12 and in doing so essentially oriented radial to the pole housing. Indentations 34, which serve to fix the connecting bridges 40, are provided in the holding elements 26 to accommodate the isolating elements 32. In this exemplary embodiment, the holding elements essentially have a tangential orientation to the surface of the pole housing, i.e., the longitudinal side runs perpendicular to the axis of the pole housing. Also visible in FIG. 5 is an opening 46 in the form of an elongated hole in the inner steel sheet strip 28 of the double-layer pole housing. A tool can grip through these openings 46, each of which is allocated to a holding element 26, during the manufacturing method in accordance with the invention for an electric motor in order to orient the holding elements 26, which are embodied as a single piece in the outer steel sheet strip 30 of the pole ring 14 and originally are still flatly adjacent in this strip.

Figure 6:
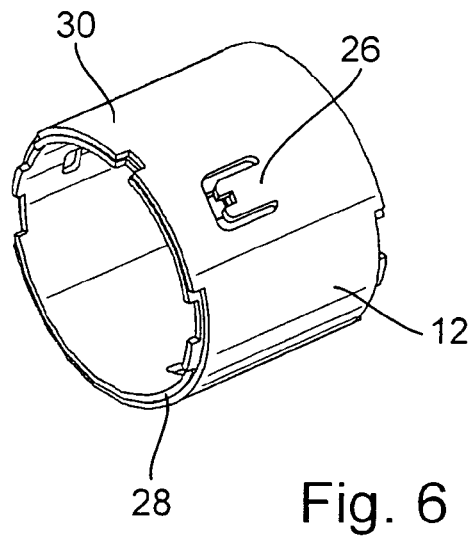
FIG. 6 A simplified perspective representation of the pole housing of an electric motor in accordance the invention as per FIG. 5 in a state where the holding means are not yet oriented.

FIG. 6 shows a pole housing 12 in accordance with the exemplary embodiment in FIG. 5 with holding elements 26 that are not yet oriented. It is evident in this depiction that the holding elements can be stamped for example only in the outer pole ring 30. Depending upon the use of the electric motor, the holding elements can then either be oriented in another manufacturing step or also remain flat in the pole ring.

It is also possible in principle to embody the pole housing 12 only as a single layer, i.e., with just one pole ring 30. The losses in magnetic flow of the one pole ring due to the then interrupted surface structure of the pole housing represent a certain disadvantage of this embodiment. However, on the other hand, this simplified embodiment results in clearly reduced expenditures for materials, manufacturing and assembly, which must be weighed against the disadvantages.

Figure 7:
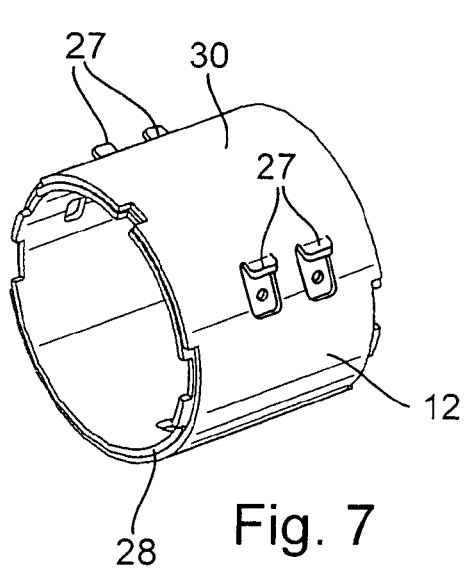
FIG. 7 A simplified perspective representation of another exemplary embodiment of a pole housing of an electric motor in accordance with the invention.
Figure 8:
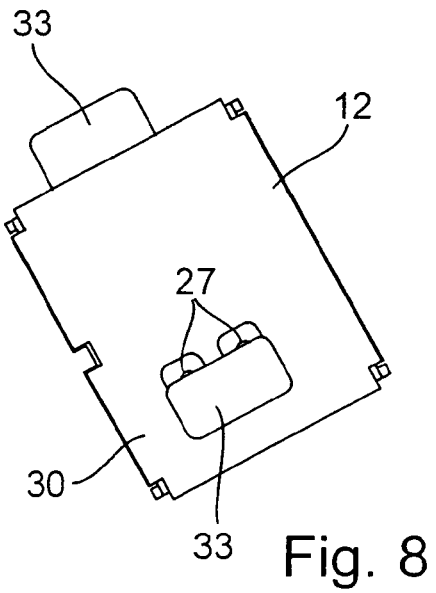
FIG. 8 A schematic representation of the pole housing of an electric motor in accordance with the invention as per FIG. 7 with mounted isolating elements.

FIG. 7 and FIG. 8 depict an alternative exemplary embodiment of a pole housing of the device in accordance with the invention. The holding elements 27 of the exemplary embodiment as per FIGS. 7 and 8 are also oriented essentially in a radial direction of the pole housing 12, but they have an axial orientation, i.e., an orientation parallel to the axis of the pole housing and thus parallel to the motor shaft. The holding elements 27 of the exemplary embodiment in accordance with FIGS. 7 and 8 are arranged respectively in pairs such that they are arranged essentially parallel to the longitudinal axis of the pole housing. The isolating elements, in this case particularly isolating elements 33, are then placed on the holding element pairs and fixed. Fixation can be accomplished, e.g., via bonding, clamping or also other fastening methods known to the person skilled in the art. Other alignments of the holding element pairs 27 and thus the isolating elements are also possible in other embodiments. The presence of holding means 27 embodied in pairs makes it possible to also fasten larger isolating elements to the pole housing 12, such as the depicted elements 33 for example.

In principle, however, it also possible to distribute the holding elements over the circumference of the pole housing not in pairs, but to use just a plurality of individual holding elements.

FIG. 8 shows a schematic representation of the pole housing in FIG. 7 with mounted isolating elements 33. The isolating elements 33 have a rounded outer surface with which they come to bear on the inner side of a corresponding receptacle housing or motor housing when the electric motor is installed. Because of the rounded surface shape of the isolating elements 33, a certain rolling in the circumferential direction of the pole housing is possible. A detailed representation of these isolating elements can be found in FIG. 12.

In the case of this type of isolation according to the exemplary embodiment in FIGS. 7 or 8, we are more likely dealing with a more rigid isolation in the axial direction, however, whose flexibility is essentially determined only by the elasticity of the material used for the isolating elements.

Figure 9:
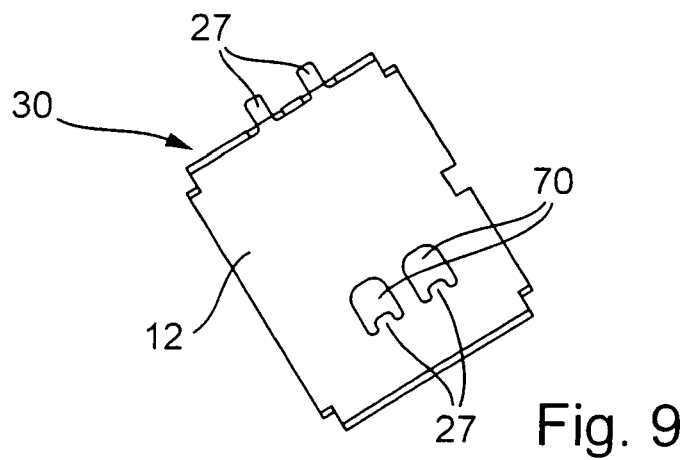
FIG. 9 A longitudinal section of an alternative exemplary embodiment of a pole housing in accordance with the invention.

FIG. 9 shows a section through a pole housing with an arrangement of the holding element in accordance with FIG. 7 in which, however, only a single-layer structure of the pole housing 12 is used. The elastic isolating elements 33 are placed on the holding elements 27 or, e.g., also bonded with them. FIG. 9 also shows the openings 70 in the surface of the pole housing, which are produced by the fact that the pole housing in this exemplary embodiment is only structured to be a single layer and therefore only has one steel sheet strip 30 that forms the pole ring. The corresponding tools can be inserted through these openings in the manner already described in order to orient the holding elements 27.

Figure 10:
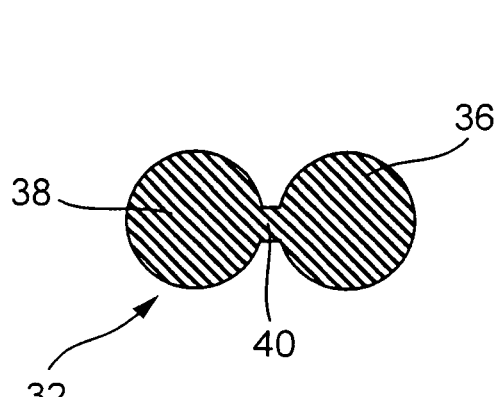
FIG. 10 A longitudinal section of an exemplary embodiment for isolating elements.
Figure 11:
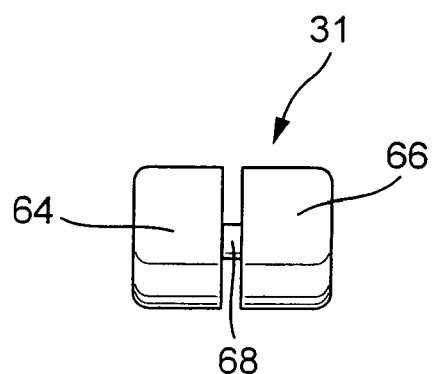
FIG. 11 A longitudinal section of an alternative exemplary embodiment for isolating elements.
Figure 12:
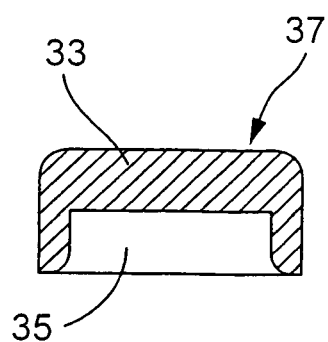
FIG. 12 A longitudinal section of an alternative exemplary embodiment for isolating elements.

In addition to the shapes of the isolating elements depicted in FIG. 2 and FIG. 8, naturally other shapes, particularly roll bodies such as roll-like or cylindrical elements for example, are also possible and useable. FIGS. 10, 11 and 12 show several examples of possible shapes of the isolating elements. Of course, other shapes are possible for the isolating elements without abandoning the underlying inventive idea.

FIG. 10 shows a schematic view of the isolating elements 32. This type of isolating element is comprised in the described manner of two essentially spherical partial bodies 36 and 38 and a bridge 40 connecting these partial bodies. The connecting bridge in this case can have, e.g., a square or even a round cross section. The isolating element 32 is advantageously manufactured as a single piece of an elastic plastic.

As another example of an isolating body, FIG. 11 shows an exemplary embodiment of isolating elements that has been modified as compared with the exemplary embodiment in FIG. 10. The isolating elements 31 in accordance with the exemplary embodiment in FIG. 11 are comprised of two roll-shaped partial bodies 64 and 66, which are permanently connected to each other via a one-piece connecting bridge 68.

The isolating elements 31 or 32 are pressed into the corresponding recesses 34 of the holding elements 26 in the area of their connecting bridge. In doing so, the respective connecting bridge of the isolating elements serves advantageously also as an assembly aid since the spherical bodies 36 and 38 must not be mounted individually for example.

FIG. 12 shows the isolating element 33 in both a longitudinal section and a cross section. With their open side 35, the isolating elements are placed on the corresponding holding elements, as shown in FIG. 8 for example. A limited rolling of the holding element 33 on the inner wall of the receptacle housing serving as a motor housing is possible with the rolled surface 37 so that a dampening of the vibrations of the electric motor can be achieved.

In contrast to known prior art isolating devices, the device in accordance with the invention does not require an additional adapter housing into which the electric motor is inserted and which typically features corresponding receptacles for isolating elements. This signifies a distinct simplification of assembly since an additional sliding on or mounting of such an adapter is eliminated.

In addition, bending of the receptacle brackets serving as holding elements 26 or 27 on the finished mounted motor is possible from the outside and even afterwards. As a result, the shaping accuracy of the pole housing 12 is retained and a motor can, e.g., be delivered to a customer also as a separate end product without already oriented holding elements.

The device in accordance with the invention is not limited to the exemplary embodiments depicted in the figures and in the description. On the contrary, these exemplary embodiments only serve to illustrate the idea underlying the invention.

The device in accordance with the invention for mounting an electric motor in a manner that isolates vibrations is not limited to the use for a fan motor. On the contrary, all electric motors for which isolation in a manner that dampens vibrations is desired can be embodied in accordance with the invention.

In particular, the device in accordance with the invention is not limited to the number and shape of isolating elements depicted in the exemplary embodiments. Isolating elements of any shape and number can be used in an advantageous manner in the device in accordance with the invention. The design of the isolating elements in this connection shall be configured in such a way that the elastic properties of the dampening elements in the mounting can be influenced in a targeted manner for radial, axial and tangential fixation in order to achieve optimal dampening behavior and therefore the desired reduction in noise.

The invention claimed is:

1. Device for mounting an electric fan motor (10) in a manner that isolates vibrations, wherein the electric motor (10) features at least one pole housing (12) as a magnetic yoke ring, with means for fastening (26, 27) elastic isolating elements (31, 32, 33), characterized in that the means for fastening (26, 27) the isolating elements (31, 32, 33) include a holding bracket (26, 27) formed from and as a single piece with a wall of at least one pole ring (14) of the pole housing (12), characterized in that the pole housing (12) is constructed to be multi-layer, and characterized in that the wall of the at least one pole ring (14) provides an outer layer of the pole housing (12) and that an inner layer of the pole housing (12) includes a second wall defining an opening (46) associated with the holding bracket (26, 27).

2. Device according to claim 1, characterized in that the means for fastening (26, 27) the isolating elements (31, 32, 33) include a plurality of holding brackets (26, 27).

3. Device according to claim 2, characterized in that the holding brackets (26, 27) are oriented radial to the pole housing (12).

4. Device according to claim 3, characterized in that the holding brackets are arranged in pairs.

5. Device according to claim 2, characterized in that the holding brackets are arranged in pairs.

6. Device according to claim 5, characterized in that the holding brackets (27) are oriented axial to the pole housing (12).

7. Device according to claim 5, characterized in that the holding brackets (26) are oriented tangential to the pole housing (12).

8. Device according to claim 1, characterized in that the isolating elements (31, 32, 33) include roll bodies.

9. Device according to claim 8 characterized in that the isolating elements (31, 32) are dumbbell-shaped.

10. Device according to claim 1, characterized in that the means for fastening (26, 27) the isolating elements (31, 32, 33) include holding brackets (26, 27).

11. Device according to claim 1, characterized in that the holding bracket (26) has an open outer end having an end surface, an indentation (34) being defined in the outer end and extending from the outer surface, an isolating element (31, 32) including a portion received in the indentation (34).

12. Device for mounting an electric fan motor (10) in a manner that isolates vibrations, wherein the electric motor (10) features at least one pole housing (12) serving as a magnetic yoke ring, with means for fastening (26, 27) elastic isolating elements (31, 32, 33) characterized in that the means for fastening (26, 27) the isolating elements (31, 32, 33) include a holding bracket (26, 27) formed from and as a single piece with a wall of at least one pole ring (14) of the pole housing (12), characterized in that the pole housing (12) is constructed to be multi-layer, characterized in that the pole housing (12) is formed as a double rolled cylinder, and characterized in that the double rolled cylinder includes an outer sheet (30) providing the wall of the at least one pole ring (14) and an inner sheet (32) defining an opening (46) associated with the holding bracket (26, 27).

13. Device according to claim 12, characterized in that the means for fastening (26, 27) the isolating elements (31, 32, 33) include holding brackets (26, 27).

14. Device according to claim 12, characterized in that the means for fastening (26, 27) the isolating elements (31, 32, 33) include a plurality of holding brackets (26, 27).

15. Device according to claim 14, characterized in that the holding brackets (26, 27) are oriented radial to the pole housing (12).

16. Device according to claim 14, characterized in that the holding brackets (27) are oriented axial to the pole housing (12).

17. Device according to claim 12, characterized in that the isolating elements (31, 32) are dumbbell-shaped.

18. Device according to claim 12, characterized in that the holding bracket (26) has an open outer end having an end surface, an indentation (34) being defined in the outer end and extending from the outer surface, an isolating element (31, 32) including a portion received in the indentation (34).

19. Device for mounting an electric fan motor (10) in a manner that isolates vibrations, wherein the electric motor (10) features at least one pole housing (12) serving as a magnetic yoke ring, with means or fastening (26, 27) elastic isolating elements (31, 32, 33), characterized in that the pole housing includes an outer layer and an inner layer, that the means for fastening (26, 27) the isolating elements (31, 32, 33) include a holding bracket (26, 27) formed from and as a single piece with the outer layer of the pole housing (12) and that the inner layer defines an opening associated with the holding bracket (26, 27).

20. Device according to claim 19, characterized in that the pole housing is formed as a double rolled cylinder including an outer sheet (30) providing the outer layer and an inner sheet (32) providing the inner layer.

* * * * *